United States Patent [19]

Pratt

[11] Patent Number: 5,145,621
[45] Date of Patent: Sep. 8, 1992

[54] CROSSOVER MOLD TOOL FOR CONSOLIDATING COMPOSITE MATERIAL

[75] Inventor: Richard D. Pratt, Cincinnati, Ohio

[73] Assignee: General Electric Company, Cincinnati, Ohio

[21] Appl. No.: 512,225

[22] Filed: Apr. 20, 1990

[51] Int. Cl.⁵ .............................................. B32B 31/00
[52] U.S. Cl. ..................................... 264/102; 156/245; 156/285; 156/382; 264/258; 264/511; 264/571
[58] Field of Search ............... 156/382, 289, 245, 285; 264/257, 258, 102, 510, 511, 512, 571

[56] References Cited

U.S. PATENT DOCUMENTS

| | | | |
|---|---|---|---|
| 4,816,106 | 3/1989 | Turris et al. | 156/289 |
| 4,842,670 | 6/1989 | Callis et al. | 264/510 |

FOREIGN PATENT DOCUMENTS

| | | |
|---|---|---|
| 0175510 | 3/1986 | European Pat. Off. |
| 848608 | 9/1960 | United Kingdom |
| 959360 | 6/1964 | United Kingdom |
| 2065022A | 6/1981 | United Kingdom |

Primary Examiner—Tim Heitbrink
Attorney, Agent, or Firm—Jerome C. Squillaro; Carmen S. Maria

[57] ABSTRACT

A curved composite material body is consolidated to a complexly curved shape by placing rigid tooling on the concave-facing side of the body, and a pressure membrane on the other (convex-facing) side of the body. In another region of the body where the sign of the curvature of the body changes so that the other side becomes the concave-facing side, the rigid tooling is placed on that side, against the concave-facing side, and the pressure membrane is contacted to the convex-facing side. The rigid tooling thus crosses over from one side to the other through various regions of the body, providing a precise consolidation to meet the structural and dimensional specifications. Consolidation is achieved by applying pressure to the body of composite material through the pressure membranes.

18 Claims, 5 Drawing Sheets

CROSSOVER MOLD TOOL FOR CONSOLIDATING COMPOSITE MATERIAL

The Government has rights in this invention pursuant to Contract No. F33657-83-C-0281 awarded by the Department of Air Force.

BACKGROUND OF THE INVENTION

This invention relates to the fabrication of composite materials, and, more specifically, to the consolidation of curved pieces of such materials.

Composite materials are hybrid materials formed by embedding reinforcement fibers, whiskers, or particles in a matrix which supports and protects the reinforcement. A variety of reinforcements are available, and carbon, graphite, glass, and Kevlar (trademark for an aromatic polyamide fiber) fibers in particular now enjoy widespread use in aerospace and other applications. Both metallic and nonmetallic matrices are available, and nonmetallics such as epoxies and polyimides are widely used for applications where the part is not exposed to high temperatures. Thus, for example, a composite material might consist of 60 volume percent of graphite fibers in a curable epoxy matrix.

In one common approach to the preparation of such materials, a manufacturer of the composite material prepares a "prepreg", which is a partially cured matrix having the proper amount of the reinforcement embedded therein. The reinforcement is commonly in the form of a unidirectional array or an interwoven, multidirectional fabric. The prepreg is provided in standard forms, as for example a tape 0.005 inches thick and 6 inches wide having a backing that permits its handling, or a fabric that is 0.013 inches thick. The prepreg is provided to the fabricator of parts, who then lays up a number of plies of the prepreg into the proper shapes and thicknesses as required by a design. The prepreg is the raw material that is used by the parts fabricator to build up the layered part.

After the prepreg tapes or fabric pieces are arranged in the proper stacked arrangement, the stacked plies must be consolidated to remove the porosity and voids that inevitably result from the layup process, and to complete the curing of the matrix. The consolidation is normally accomplished at an elevated temperature and with the application of external pressure to the part, so that the porosity and voids are closed before the matrix cures.

Where the part is, for example, a flat sheet, a piece of rigid tooling is placed against one side of the sheet and a flexible pressure membrane, such as a high temperature, gas impervious polyimide vacuum bag, is placed against the other side. A pressure is applied to the pressure membrane, either with a positive fluid (liquid or gas) pressure to the outside of the membrane, as for example about 200 pounds per square inch pressure, or with a vacuum applied to the space between the membrane and the composite material, so that the external atmospheric pressure supplies the consolidating pressure. Both positive pressure and vacuum consolidation are often used together for the best results.

Such existing techniques work well when the piece or body is flat or has a simple curvature. However, it is observed that, when complexly curved bodies are made by this consolidation approach, there may be irregularities such as bridging and folds on the concave-facing surface of the composite part, which can lead to reduced strength and premature failure of the composite material in that region.

There is a need for an improved approach to the consolidation of composite prepreg materials into final cured bodies, particularly where the bodies are complexly curved. The present invention fulfills this need, and further provides related advantages.

SUMMARY OF THE INVENTION

The present invention provides a process and apparatus for consolidating composite bodies or parts that are complexly curved or for other reasons tend to form irregularities during the consolidation and curing operations. The approach is consistent with existing technology, in that it involves rigid tooling, pressure membranes, and the application of pressure to the membranes to accomplish consolidation of the composite material body. However, the tooling and pressure membrane are arranged in an innovative manner to minimize the introduction of defects into the composite material body.

In accordance with the present invention, a process for consolidating a composite material body having a nonplanar shape comprises the steps of furnishing a composite material body having a structure formed of unconsolidated plies of reinforcement fibers embedded in a matrix, the composite material body having a first side and an Opposing second side, the shape of the body being complexly curved so that in a first region the first side of the composite material forms a concave face of the curve and in a second region the second side of the composite material forms the concave face of the curve; placing a first rigid tool in contact with the first side of the composite material in the first region; placing a second rigid tool in contact with the second side of the composite material in the second region; placing a first consolidation pressure membrane against the second side of the composite material in the first region; placing a second consolidation pressure membrane against the first side of the composite material in the second region; and applying a pressure to the first consolidation pressure membrane and the second consolidation pressure membrane, thereby applying a pressure to the composite body to cause it to consolidate.

In the prior conventional approach, rigid tooling is placed on one side of the unconsolidated composite material body and a pressure membrane on the other side, regardless of the particular shape of the body. If the body is flat or simply curved with the tool on the concave side of the curve, the process works well because the composite material is compressed into the tool by the pressure from the pressure membrane. The presence of the rigid tool dictates the shape and dimensions of the surface contacting the tool, and the tool prevents the formation of faults in the surface plies of the composite material body.

On the other hand, if the part is complexly curved, which as used herein means that the concave surface of the composite body is sometimes on a first side of the composite material and sometimes on the second, then the placement of the rigid tooling only on one side results in uneven quality. In those regions where the concave facing side of the composite body is against the rigid tool, the quality of that region will normally be acceptable. However, for those regions where the concave face of the composite body is on the side opposite the rigid tooling (i.e. the convex face of the composite body is on the side in contact with the rigid tooling), the concave face is contacted and supported only by the flexible pressure membrane, which ordinarily is insufficient to prevent the occurrence of faults, particularly at sharp corners having a small bend radii.

In the present approach, the rigid tooling is placed on the side where its presence is needed to properly constrain the body and prevent introduction of defects. For a complexly curved part, the tooling is placed on the concave facing side of the composite body, whichever side that may be in a particular instance. The tooling is more complex as a result, but the likelihood of producing a part having good quality throughout is significantly increased. Thus, the complexly-shaped composite material bodies or parts made by this approach are not otherwise available.

More generally, but still in accordance with the invention, a process for consolidating a body of a composite material comprises the steps of furnishing a body of a composite material having a structure formed of unconsolidated plies of reinforcement fibers embedded in a matrix, the body having a first side and an opposed second side; placing a first rigid tool against the first side of the composite material in a first region; placing a second rigid tool against the second side of the composite material in a second region; placing a first consolidation pressure membrane against the second side of the composite material in the first region; placing a second consolidation pressure membrane against the first side of the composite material in the second region; and applying a pressure to the first consolidation pressure membrane and the second consolidation pressure membrane, thereby applying a pressure to the composite material to cause it to consolidate.

Prior to consolidation, the unconsolidated body of composite material formed from the several plies must first be debulked to partially consolidate the body. Debulking is normally accomplished at ambient temperature, so that the matrix of the composite material does not cure further. Debulking is conducted in one or several steps, the latter in the case where it is desirable to lay up a number of plies, debulk, lay up more plies, debulk, and so forth.

The present approach permits debulking, in one or several steps, followed by final consolidation. In accordance with this aspect of the invention, a process for consolidating a body of a composite material comprises the steps of furnishing a body of a composite material having a structure formed of unconsolidated plies of a matrix having reinforcement fibers embedded therein, the body having a first side and an opposing second side; debulking the body by the steps of placing a first rigid debulking tool against the first side of the body of composite material in a first region thereof, placing a second rigid debulking tool against the first side of the body of composite material in a second region thereof, placing a single, continuous debulking pressure membrane against the second side of the body of composite material in both the first and second regions thereof so that a pressure may be applied uniformly to the entire second side, and applying pressure to the debulking pressure membrane to cause the body of composite material to at least partially consolidate, and removing the debulking pressure membrane from the second side of the body and the second debulking tool from the first side of the body of composite material in the second region; placing a third rigid debulking tool against the second side of the body of composite material in the second region thereof; placing a first consolidation pressure membrane against the second side of the body of composite material in only the first region thereof; placing a second consolidation pressure membrane against the first side of the body of composite material in only the second region thereof; and applying pressure to the first consolidation pressure membrane and to the second consolidation pressure membrane to cause the body of composite material to further consolidate, while simultaneously heating the body of composite material.

The present invention also extends to the apparatus, including the arrangement of the tooling and the pressure membrane, that is used to consolidate composite material into articles. In accordance with this aspect of the invention, there is provided apparatus for consolidating a body of an unconsolidated composite material, the body having a first side and an opposing second side, which comprises a first rigid tool shaped to fit the first side of the composite body in a first region; a second rigid tool shaped to fit the second side of the composite body in a second region; a first consolidation pressure membrane disposed to contact the second side of the composite body in the first region; a second consolidation pressure membrane disposed to contact the first side of the composite body in the second region; and means for applying a pressure to the first and second consolidation pressure membranes.

A variation of this apparatus includes tooling for performing debulking, which is removed and replaced with the consolidation tooling after debulking. This rigid tooling for debulking may also be utilized to perform consolidation operations if desired, or optional separate consolidation tooling may be utilized. In accordance with this aspect of the invention, apparatus for consolidating a composite material having a first side and a second side thereof comprises a first rigid tool for debulking shaped to fit against the first side of the body of composite material in a first region thereof; a second rigid tool for debulking shaped to fit against the first side of the body of composite material in a second region thereof; a debulking pressure membrane sized to fit against the second side of the body of composite material in both the first and second regions thereof; a third rigid tool shaped to fit against the second side of the body of composite material in the second region thereof; a first consolidation pressure membrane sized to fit against the second side of the body of composite material in the first region thereof; and a second consolidation pressure membrane sized to fit against the first side of the body of composite material in the second region thereof.

The present arrangement of consolidation tooling has been termed "crossover" tooling, because the rigid tooling is located on one side of the body in some regions, and on the other side of the body in others. Care must be taken that the consolidating force is applied uniformly in all areas and regions of the composite body. Otherwise, there might be unconsolidated regions that contain voids and other defects that might cause premature failure of the body or part in service.

The present invention provides an approach for consolidating composite bodies that results in improved final structures, as compared with prior approaches. The required tooling is more complex, but is normally readily constructed for commonly required shapes. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

Figure 1:
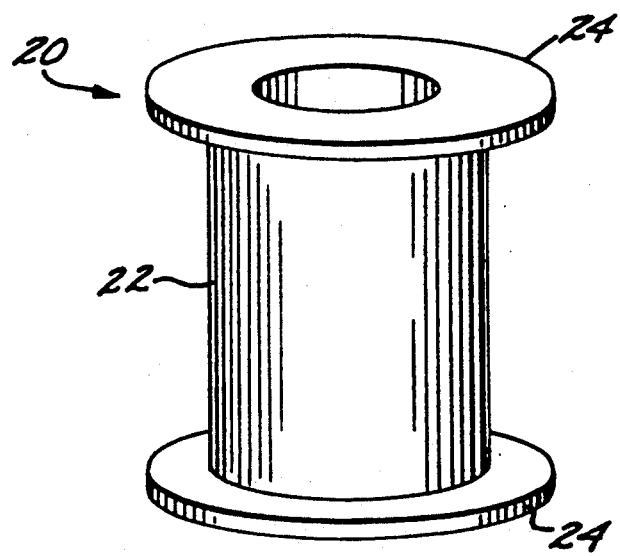
FIG. 1 is a perspective drawing of a composite body in the form of a cylinder with end flanges.

FIG. 1 depicts an illustrative part 20 to be made from a composite material. The part 20 includes a hollow cylindrical body 22 and a thick flange 24 at each end of the body 22, and may be joined end-to-end with similar parts to form a duct. The body 20 is chosen to illustrate the approach of the invention because it has a compound curvature that cannot be readily fabricated without flaws using prior art approaches.

Figure 2:
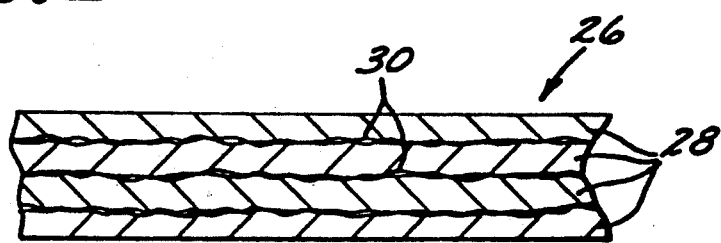
FIG. 2 is a side sectional view of several plies of composite material stacked together.

The body 22 and the two flanges 24 are to be formed as a single, integral body from individual plies of composite materials, such as shown in FIG. 2. A composite material body 26 is formed by stacking individual plies 28 of a prepreg material on top of each other. In a typical situation encountered in manufacturing such a body 26, each prepreg ply 28 is formed of a matrix of a partially cured polymer such as a polyimide or an epoxy, in which the required percentage of a reinforcing fiber such as carbon filaments is embedded. The reinforcing fibers may be arranged in essentially a unidirectional manner, and in this case the prepreg is furnished as a tape that is typically 0.005 inches thick and 6 inches wide. The reinforcing fibers may instead be woven and multidirectional, and in this case the prepreg is furnished commercially as a woven fabric that is typically 0.013 inches thick after consolidation and curing. In all cases, the matrix of the prepreg is uncured or only slightly cured.

Thicker bodies are gradually built up by stacking the individual plies of prepreg tapes or woven fabric one over the other until the desired thickness is reached. In the illustration of FIG. 2, four plies 28 of the prepreg material have been stacked, but the process is often extended to stack tens of plies together.

As schematically illustrated in FIG. 2, there are empty spaces or voids 30 between the stacked plies, because the prepreg plies 28 are not perfectly flat when provided by the manufacturer. Also, there may be microscopic voids within each ply 28, that are visible under a microscope but not in the macroscopic view of FIG. 2. Virtually all of these voids must be eliminated so as not to be present in the final structure, and the consolidation processing ideally closes both the macroscopic and the microscopic voids, while at the same time completing the curing of the matrix material of the ply. The result is a sound composite body that has high strength for its weight, and is therefore a good candidate for use in aircraft and other types of structures.

Figure 3:
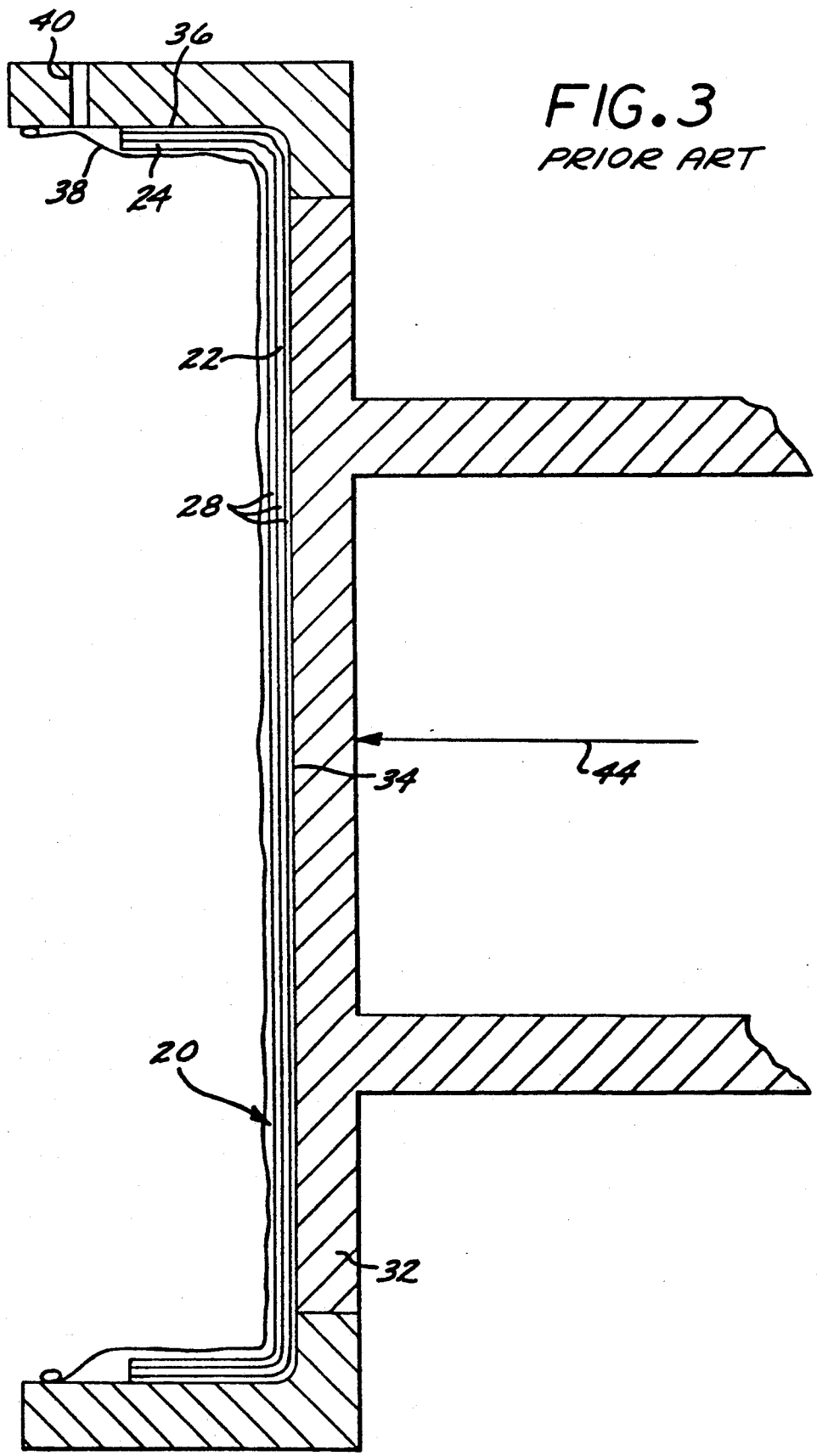
FIG. 3 is a side view of a conventional tool for consolidating the composite body of FIG. 1.

FIG. 3 depicts a conventional, prior approach to the consolidation of the composite material to form the flanged cylinder of FIG. 1. The individual plies 28 are laid up against a cylindrically symmetric steel tool 32 (viewed in section in FIG. 3) that defines the inside wall 34 of cylindrical body 22, and also defines each flange 24, and flange face 36.

A vacuum bag 38 is sealed over the opposite surface of composite material plies 28, that is, the surface not contacting tool 32. A pressure is applied to the surface of plies 28, by drawing a vacuum on a port 40 that communicates with the space between tool 32 and vacuum bag 38. Atmospheric pressure of about 14–15 pounds per square inch is thereby applied evenly to the outer surface of the vacuum bag 38 and thence against plies 28. The entire tooling and stacked plies are placed into a pressurized autoclave and heated, which permits the matrix material within the plies to flow so that voids 30 are gradually reduced in size and closed. The vacuum is normally applied prior to heating, so that the voids are closed before the matrix polymer can cure and harden, whereby further closure of the voids is halted. By using this approach, the voids are closed and the matrix is cured.

Figure 4:
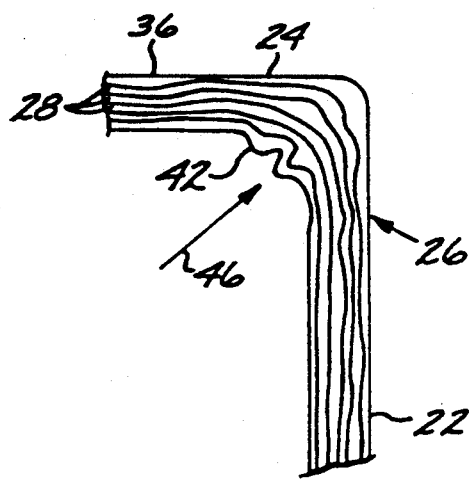
FIG. 4 is a enlarged view of a detail of FIG. 3, showing the structure of the plies near a corner resulting from a consolidation using the prior approach.
Figure 5:
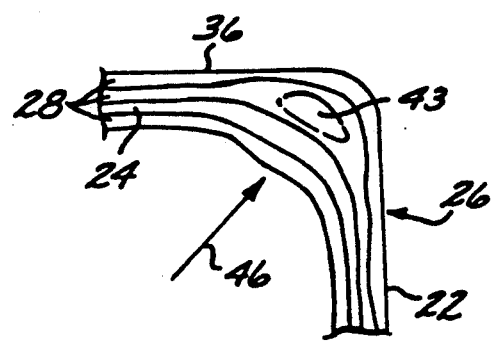
FIG. 5 is a view similar to FIG. 4, illustrating another type of defect that may occur at a corner.

This prior approach, however, results in the introduction of consolidation-induced faults at the corners which form a transition between cylindrical body 22 and flange 24, as illustrated in FIG. 4 and FIG. 5. Faults 42 of FIG. 4 are essentially wrinkles in the surface plies of composite material located upon the concave surface of composite body 26 at the corner where the transition from cylindrical body 22 to flange 24 occurs. The wrinkles arise because vacuum bag 38 is not sufficiently rigid to constrain the plies as the voids are collapsed and the thickness of composite body 26 is reduced.

Another type of fault 43, illustrated in FIG. 5, is termed "bridging." It arises because, even during consolidation, each ply has a length that is constant. As a ply of constant length, with the ends fixed by the tooling, is forced into the corner, it does not have sufficient length, and cannot stretch, so as to conform to the corner. The result is a void in the corner. Faults 42 and 43 of FIGS. 4 and 5 respectively are highly undesirable because they weaken composite material body 26 at the interior corner where transition occurs between cylindrical body 22 and flange 24, and may lead to failure there when the body or part is placed into service.

Figure 6:
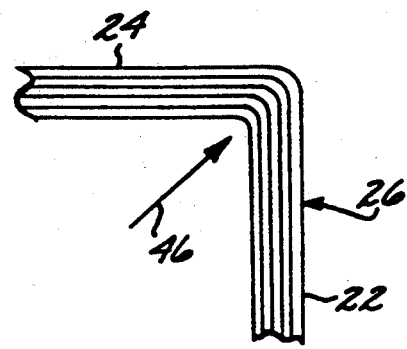
FIG. 6 is a view similar to that of FIG. 4, except illustrating the desired structure near the corner.

By contrast, the desired structure is that depicted in FIG. 6, where there are no such faults.

Figure 7:
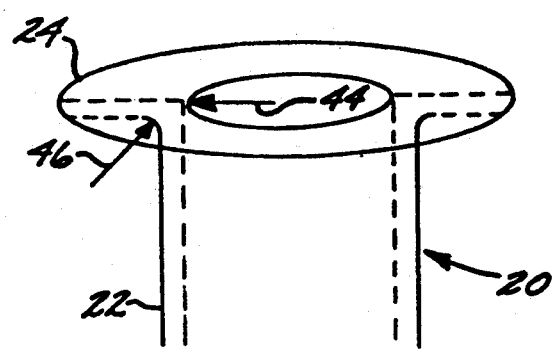
FIG. 7 is a schematic view of a complexly curved surface of a composite body, illustrating nomenclature.

The problem of the formation of the faults cannot be solved simply by providing tooling that defines the outside wall of cylindrical body 22 while defining flanges 24, and a vacuum bag which is sealed over the surface of the composite material opposite of where it will contact the tooling i.e. the inside diameter of cylindrical body 22 and flange faces 36, for the reason shown in FIG. 7. Part 20 has a compound curvature as a result of a plurality of local centers of curvature. Cylindrical body 22 has a radius of curvature 44 that is on the inside of part 20. The corner forming the intersection between cylindrical body 22 and flange 24 has another radius of curvature 46 (also shown in FIGS. 4-6), which is on the outside of part 20. If the positions of the tooling and the vacuum bag were reversed from the positions shown in FIG. 3, the same problem with faults would be encountered on the interior surface of cylindrical body 22. Moreover, in the particular part 20, the inner diameter of cylindrical body 22 is to be maintained to a strict specification value, and a reversal of the positions of the tooling and the vacuum bag would not permit maintaining that value.

Figure 8:
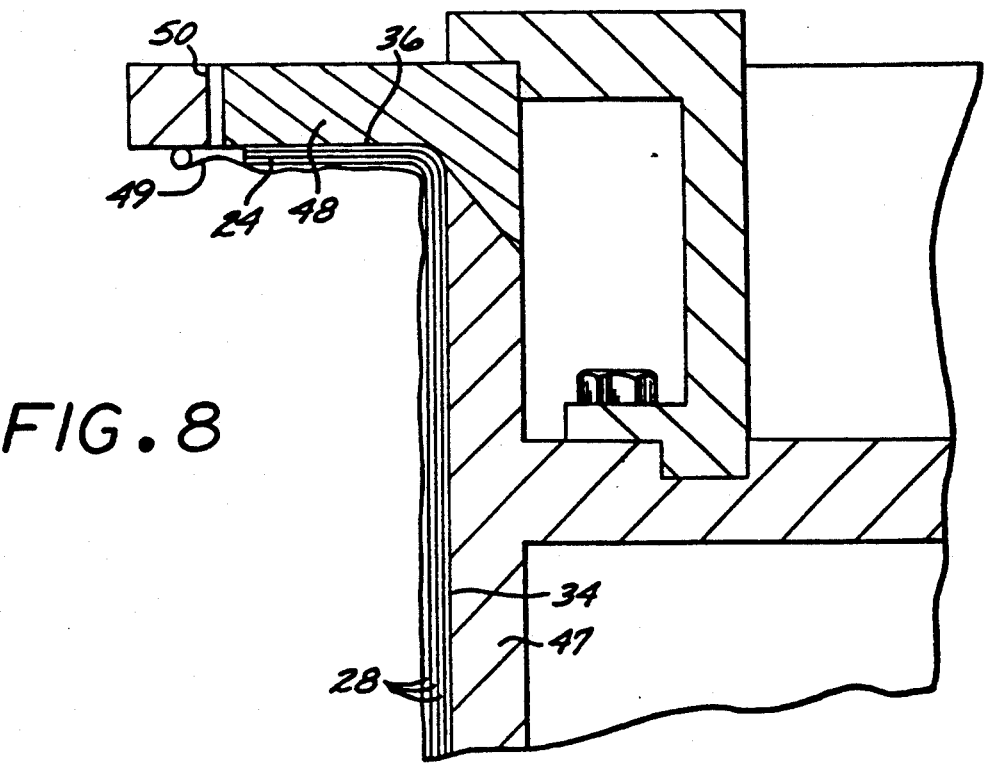
FIG. 8 is a side sectional view of the apparatus illustrating the laying up of the composite material prior to consolidation.
Figure 9:
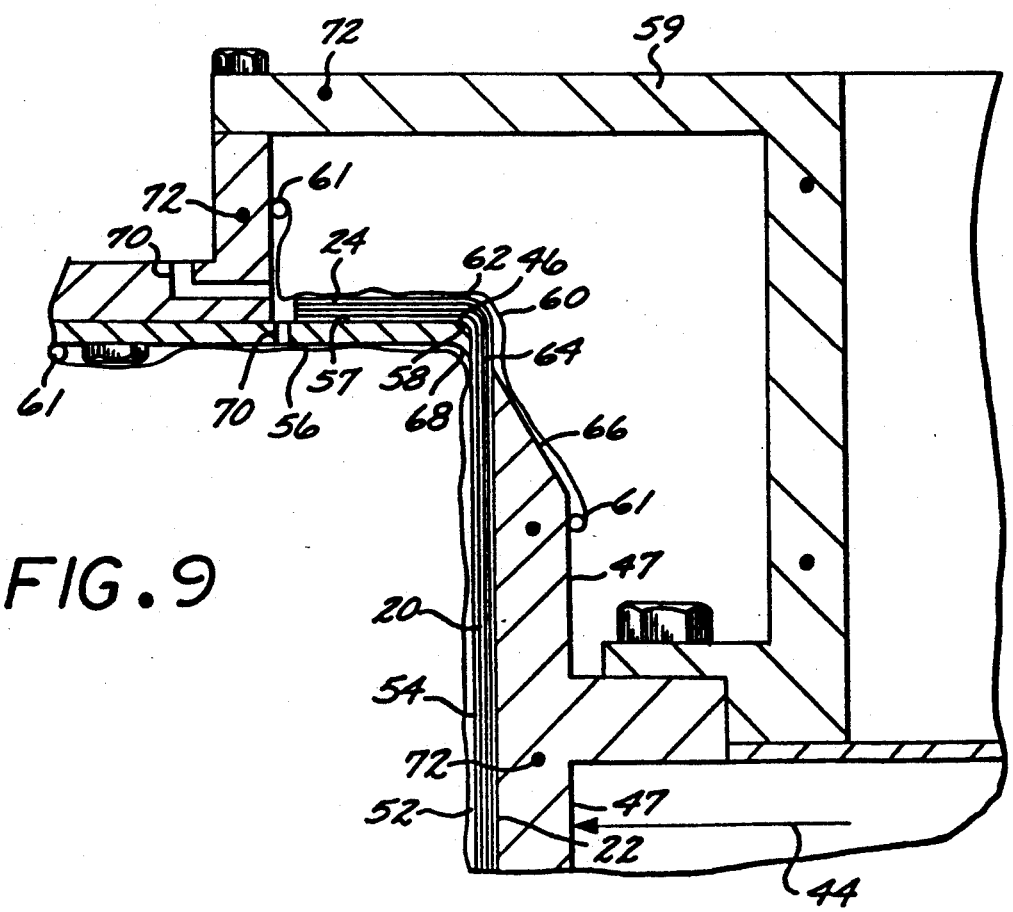
FIG. 9 is a side sectional view of the apparatus for consolidating the composite cylinder of FIG. 1, using the crossover tooling approach.

The present invention is illustrated in FIG. 8 and FIG. 9. A three step layup, debulking and consolidating procedure is used. For initial layup of the plies of composite material, illustrated in FIG. 8, individual plies 28 are placed against tooling that lies on one side of the part. The tooling includes a first rigid tool 47 that defines the cylindrical surface of the part, and second removable end tools 48 for debulking that define flange faces 36 of flanges 24 and the corner between flanges 24 and the cylindrical surface. This arrangement of the tooling, with all of the rigid tooling on one side of the part, facilitates the placement of the plies into the generally correct shape for part 20.

Still referring to FIG. 8 for debulking, a debulking pressure membrane 49 is placed over the side of plies 28 opposite the tooling, and a vacuum drawn through a port 50 to the space between plies 28 and membrane 49. The resulting external pressure against plies 28 forces plies 28 into the general shape defined by the tooling. The tooling and composite material plies may be heated slightly during debulking to soften the matrix, but not to the curing temperature, and consequently little or no curing of the composite material occurs during debulking. Debulking sizes the assembled plies to reduce the tendency to wrinkle in the cured composite article. The sizing permits the consolidation tooling to fit up to the body more readily. Debulking also removes a portion of the voids without fixing the composite material into its final, cured shape. However, debulking alone is not sufficient to remove the last of the voids, and cannot produce a finished part.

After debulking, the debulking pressure membrane 49 is removed and second rigid tools 48 for debulking are replaced by third rigid tools 56, one at each end of the cylinder, as shown in FIG. 9 for one end of the cylinder. First rigid tool 47, along the interior cylindrical surface, remains in the same position for layup, debulking and consolidation. Thus, for consolidation, the rigid tooling is provided as multiple pieces, some of which are on one side of part 20 and some of which are on the opposite side of part 20. In a similar manner, the debulking pressure membrane is replaced by multiple pressure membranes that are oppositely disposed to the pieces of rigid tooling.

More specifically, first rigid tool 47 is disposed adjacent the inside or concave surface 34 of the cylindrical body over the region where radius of curvature 44 is on that side of part 20. A first consolidation pressure membrane 52 is disposed oppositely to first rigid tool 47, that is, adjacent to an outside surface 54 of cylindrical body 22. A third rigid tool 56 is disposed so that a flat surface 57 thereof fits against and defines the inwardly facing surface of flange 24, and a convex surface 58 of third rigid tool fits into and defines the concave curvature of the corner between body 22 and flange 24, where the radius of curvature 46 is on that side of part 20. A four-part spider tool 59 removably fixes third rigid tool 56 in place to first rigid tool 47. A second consolidation pressure membrane 60 is disposed oppositely to third rigid tool 56, that is, on the side of the plies adjacent to convex surface 62 of each flange corner. All pressure membranes are sealed along their edges with pressure seals 61 of the type commonly used in composite materials technology.

Thus, each region of part 20 has a rigid tool on one side and a pressure membrane on the other, but the side upon which each is found may be changed as necessary so that the rigid tooling is placed adjacent the concave, most sharply curved, surface of the composite material in that region. The location at which the change of tooling and membrane from one side to the other occurs is termed the crossover point 64.

At crossover point 64, it is preferred that there be a smooth transition of the tooling and pressure membrane from one side of part 20 to the other side. The smooth transition is facilitated by tapering rigid tools 47 and 56 with incline surfaces 66 and 68 respectively. These inclined surfaces 66 and 68 permit the adjacent pressure membranes to be brought into a smooth, unwrinkled contact with the surface of part 20 in the illustrated manner. If, on the other hand, the ends of tools 47 and 56 were squared off, the pressure membranes draped over those ends might wrinkle at the corners so that consolidation pressure could not be smoothly applied to composite material body 26.

The consolidation pressure may be applied by drawing a vacuum under each pressure membrane 52 and 60 through a vacuum port 70 which communicates with the interior of the space between each pressure membrane and the adjacent portion of the composite material body 26. Care must be taken that there is a communication of the vacuum to each such interior space defined by a pressure membrane. When the vacuum is drawn on the vacuum port 70, atmospheric pressure of 14-15 pounds per square inch is applied to each of the pressure membranes, resulting in consolidation of body 26 against the respective tool. A further approach, where a greater pressure is required, is to apply a positive gas pressure to the external surfaces of the pressure membranes by placing the entire part and tooling into a pressurized, heated chamber termed an autoclave. Most preferably, both vacuum and external gas pressure may be applied in selected combinations, or different amounts of vacuum and pressure may be applied in different regions of the part, as may be required for particular configurations of parts.

The composite material is normally heated during consolidation, to assist in the consolidation by softening the matrix and also to cure the polymer matrix of the composite material. The heating is usually provided by heating elements in the autoclave. Alternatively, heat may be provided by heating tapes wrapped around the composite part and tooling, or heating elements 72 embedded in the tooling.

The approach illustrated in FIG. 9 avoids faults on the concave surfaces of the regions of part 20, comparable to those illustrated in FIGS. 4 and 5. The corner between the cylindrical body and the flange is smooth, regular, and without folds and bridging, like that illustrated in FIG. 6. Moreover, those surfaces may be made to particular dimensional specifications of the concave and adjacent flat surfaces, as is normally required in many parts.

A composite part of the type shown in FIG. 1 has been prepared using the approach of the invention. The cylindrical body had an inside diameter of about 36 inches and a length of about 15 inches. The thickness of the cylindrical body and the end flanges, after completion of the part, is about 0.2 inches. The composite material in this case was formed of about 60 percent by volume carbon fibers in a partially cured matrix of polyimide material.

To prepare the part, steel tool pieces as shown in FIG. 8 were held in place in a jig, and 15 plies of composite material prepreg were laid up on the tooling, 5 plies at a time, separated by debulking of the plies that had been laid up to that time. That is, the first 5 plies were laid up, then debulked. Five more plies were added, and then the total of 10 plies was debulked. A final debulking occurred after the last 5 plies were laid up. In each debulking procedure, the indicated number of plies was laid up, and the debulking membrane polyimide film was placed against the composite material on the opposite side from the tooling. A mechanical pump vacuum was pulled on the vacuum lines to apply pressure to the composite material through the pressure membranes for about 15 minutes, thereby debulking the composite material body. The composite material part was heated to about 150° F. during the debulking operation.

For consolidation, the rigid tools for debulking were removed and replaced by the second set of rigid tools. The consolidation membranes of polyimide film were positioned against the composite material opposite to the rigid tooling and sealed in place, in the manner illustrated in FIG. 9, prior to final assembly of the tooling. (Alternatively, other flexible materials such as Viton (trademark for a synthetic rubber derived from the combination of vinylidene fluoride and hexafluoropropylene) or Teflon (trademark for polytetrafluoroethylene) membranes can be used.) The tooling and composite material were placed into an autoclave, and a mechanical pump vacuum applied to the spaces between the consolidation membrane and the tooling, prior to heating in the autoclave. An autoclave pressure of 200 pounds per square inch was established with an inert atmosphere. The tooling and composite material were then heated in the autoclave to a temperature of 600° F. and held for 180 minutes to achieve full consolidation and curing of the polyimide composite matrix. The tooling and consolidated composite material were then cooled to ambient temperature and the tooling removed. The resulting composite material part was of high quality and did not exhibit the types of faults discussed in relation to FIGS. 4 and 5.

While described in relation to the preferred embodiment shown in the figures, the approach of the present invention is not so limited. It may be utilized in a wide variety of parts where there is more than one curvature to the part such that a single rigid tool and vacuum bag arrangement cannot be designed to avoid the problems previously described. The tooling and membranes required are more complex in the crossover approach than in the conventional approach, as may be seen by comparing FIGS. 8 and 3, but the additional complexity permits the preparation of a part free from defects associated with the conventional approach.

Figure 10:
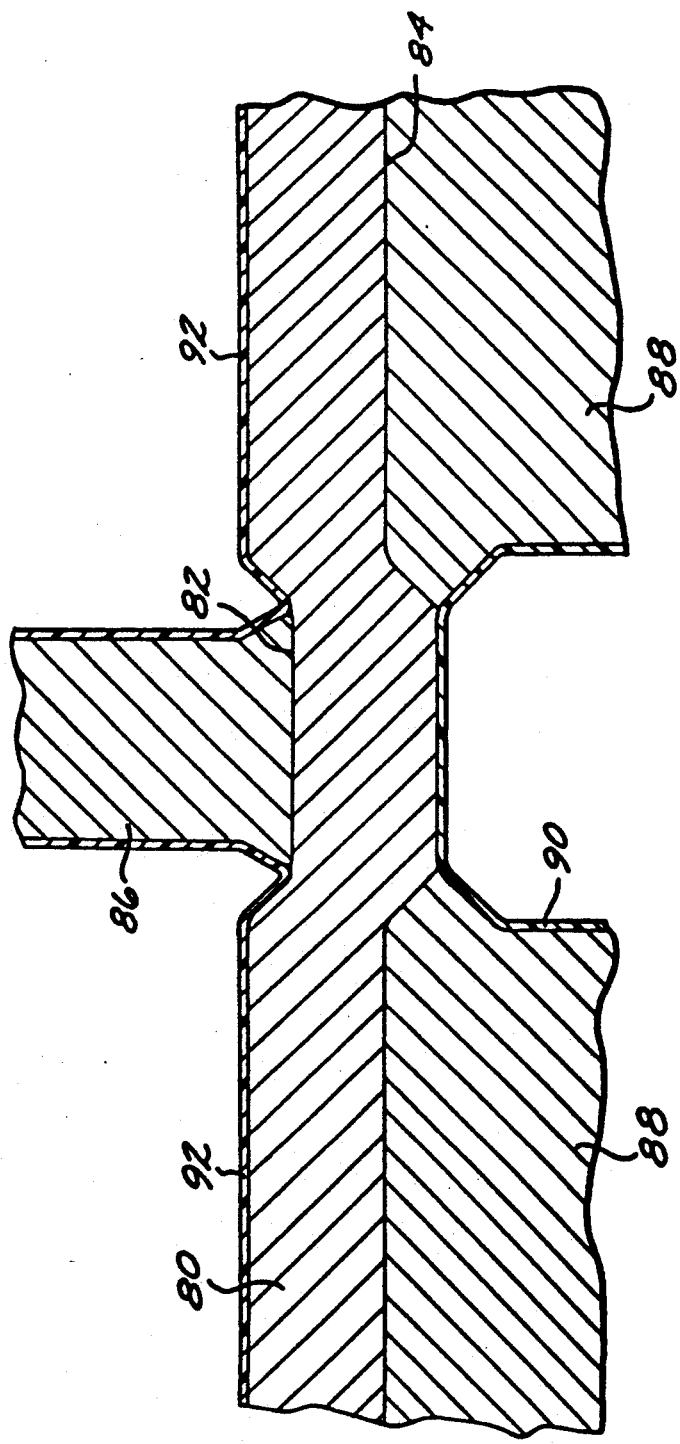
FIG. 10 is a side sectional view of another part that may be prepared by the approach of the invention.

Another application of this technique is illustrated in FIG. 10. A composite body 80 is required to have a well defined first surface 82 in a first region, and another well defined second surface 84 (on the other side of the body 80) in a second region. A first rigid tool 86 contacts first surface 82, and a second rigid tool 88 contacts second surface 84. A first pressure membrane 90 contacts the second surface 84 in the region opposite first rigid tool 86. A second pressure membrane 92 contacts first surface 82 opposite second rigid tool 88. Consolidation is accomplished in the manner previously discussed.

Although the present invention has been described in connection with specific examples and embodiments, it will be understood by those skilled in the arts involved that the present invention is capable of modification without departing from its spirit and scope as represented by the appended claims.

What is claimed is:

1. A process for consolidating a composite material body, comprising the steps of:
   furnishing a composite material body having a structure formed of unconsolidated plies of reinforcement fibers embedded in a matrix, the body having a first side and an opposed second side; then,
   placing a first rigid tool against the first side of the composite body in a first region;
   placing a second rigid tool against the second side of the composite body in a second region;
   placing a first consolidation pressure membrane having at least two faces against the second side of the composite body in the first region;
   placing a second consolidation pressure membrane having at least two faces against the first side of the composite body in the second region; and
   applying a pressure to the first consolidation pressure membrane and the second consolidation pressure membrane, thereby applying a pressure to the composite body to cause it to consolidate.

2. The process of claim 1, including the additional step, after the step of placing a second consolidation pressure membrane, of:
   heating the composite material, the tools, and the consolidation pressure membranes to an elevated temperature to cause the composite material to cure.

3. The process of claim 1, wherein the body of composite material includes at least two curved regions, a convex and a concave region, a rigid tool is placed against the concave face of each of the curved regions, and each respective consolidation pressure membrane is placed against the convex face of the corresponding curved regions.

4. The process of claim 1, wherein the step of applying a pressure is accomplished by applying a positive pressure to the face of the consolidation pressure membrane not in contact with the body of composite material.

5. The process of claim 1, wherein the step of applying a pressure is accomplished by drawing a vacuum on the face of the consolidation pressure membrane next to the composite material.

6. The process of claim 1, including the additional step, after the step of furnishing but before the step of placing a first rigid tool, of:
   debulking the composite material body.

7. The process of claim 2 wherein the steps of heating and applying pressure to the composite material are performed in an autoclave.

8. A process for consolidating a body of a composite material having a nonplanar shape, comprising the steps of:

furnishing a composite material body having a structure formed of unconsolidated plies of reinforcement fibers embedded in a matrix, the shape of the body being complexly curved so that in a first region a first side of the composite material forms the concave face of the curve and in a second region a second side of the composite material forms the concave face of the curve; then, placing a first rigid tool against the first side of the composite material in the first region;

placing a second rigid tool against the second side of the composite material in the second region;

placing a first consolidation pressure membrane against the second side of the composite material in the first region;

placing a second consolidation pressure membrane against the first side of the composite material in the first region; and applying a pressure to the first consolidation pressure membrane and to the second consolidation pressure membrane, thereby applying a pressure to the composite material to cause it to consolidate.

9. The process of claim 8, wherein the step of applying a pressure is accomplished by introducing a positive pressure to the side of the consolidation pressure membrane not in contact with the composite material body.

10. The process of claim 8, wherein the step of applying a pressure is accomplished by drawing a vacuum on the side of the consolidation pressure membrane facing the composite material.

11. The process of claim 8, including the additional step, after the step of placing a second consolidation pressure membrane, of:

heating the composite material body, the tools, and the consolidation pressure membranes to a temperature above ambient temperature to cause the composite material to cure.

12. The process of claim 8, wherein the composite material has the shape of a flanged cylinder.

13. The process of claim 8, including the additional step of debulking the composite material after the step of furnishing but before the step of placing a first rigid tool.

14. The process of claim 11 wherein the steps of heating and applying pressure are performed in an autoclave.

15. A process for consolidating a composite material body, comprising the steps of:

furnishing a composite material body having a structure formed of unconsolidated plies of a matrix having reinforcement fibers embedded therein, the body having a first side and an opposing second side; then, debulking the body by the steps of:

placing a first rigid tool against the first side of the composite material body in a first region, placing a second rigid tool against the first side of the composite material body in a second region, placing a debulking pressure membrane against the second side of the composite material body in the first and second regions, applying pressure to the debulking pressure membrane to cause the composite material body to at least partially consolidate, and removing the debulking pressure membrane and the second rigid tool;

placing a third rigid tool against the second side of the composite material body in the second region thereof;

placing a first consolidation pressure membrane against the second side of the composite material body in the first region thereof;

placing a second consolidation pressure membrane against the first side of the composite material body in the second region thereof; and applying pressure to the first consolidation pressure membrane and to the second consolidation pressure membrane while simultaneously heating the composite material body, to cause the composite material to further consolidate and cure.

16. The process of claim 15 wherein the step of applying pressure and simultaneously heating the composite material is performed in an autoclave.

17. The process of claim 15, wherein the body of composite material is complexly curved so that, in the first region, the first side is concave and that, in the second region, the second side is concave.

18. The process of claim 15 wherein the debulking step includes the additional operation of heating the composite material to a temperature above ambient and below the curing temperature.

* * * * *